United States Patent [19]
Higuchi

[11] Patent Number: 5,537,616
[45] Date of Patent: Jul. 16, 1996

[54] IMAGE COMPRESSING APPARATUS

[75] Inventor: Hirokazu Higuchi, Fujisawa, Japan

[73] Assignee: Canon Kabushiki Kaisha, Tokyo, Japan

[21] Appl. No.: 353,346

[22] Filed: Dec. 5, 1994

Related U.S. Application Data

[63] Continuation of Ser. No. 969,377, Oct. 30, 1992, abandoned.

[30] Foreign Application Priority Data

Oct. 31, 1991 [JP] Japan ................................. 3-285951

[51] Int. Cl.$^6$ ................................................. G06K 9/36
[52] U.S. Cl. .................... 382/239; 382/245; 382/246; 358/427; 358/261.2
[58] Field of Search ........................... 382/56, 239, 245, 382/246, 232; 358/261.1, 261.2, 426, 427, 430, 433

[56] References Cited

U.S. PATENT DOCUMENTS

| | | | |
|---|---|---|---|
| 4,610,027 | 9/1986 | Anderson et al. | 382/56 |
| 4,646,356 | 2/1987 | Anderson et al. | 358/261.1 |
| 4,750,043 | 6/1988 | Hisada et al. | 358/261 |
| 4,797,945 | 1/1989 | Suzuki et al. | 382/56 |
| 4,939,583 | 7/1990 | Tsuboi et al. | 358/261.1 |
| 5,305,111 | 4/1994 | Chao et al. | 358/426 |

*Primary Examiner*—Leo Boudreau
*Assistant Examiner*—David R. Anderson
*Attorney, Agent, or Firm*—Fitzpatrick, Cella, Harper & Scinto

[57] ABSTRACT

In an image compressing apparatus of this invention, a table of extended MH codes is prepared with respect to combinations of consecutive black/white pixels. When a portion where frequent changes between black and white occur is to be coded, consecutive black/white pixels are coded at once without measuring the run lengths of pixels. These extended MH codes are obtained by combining MH codes corresponding to black and white runs whose run lengths are determined in one byte of an original image.

3 Claims, 9 Drawing Sheets

| | ORIGINAL IMAGE PATTERN |
|---|---|
| NONE | ; 0 0 0 0 0 0 0 0 B |
| NONE | ; 0 0 0 0 0 0 0 1 B |
| 0 1 0 (BLACK "1") | ; 0 0 0 0 0 0 1 0 B |
| NONE | ; 0 0 0 0 0 0 1 1 B |
| 0 1 0 (BLACK "1") | ; 0 0 0 0 0 1 0 0 B |
| 0 1 0 0 0 0 1 1 1 0 1 0 0 0 0 1 1 1 0 1 0 (BLACK "1", WHITE "1", BLACK "1", WHITE "1", BLACK "1") | ; 0 1 0 1 0 1 0 0 B |
| 0 0 0 1 1 1 (WHITE "1") | ; 1 1 1 1 1 0 1 1 B |
| NONE | ; 1 1 1 1 1 1 0 0 B |
| 0 0 0 1 1 1 (WHITE "1") | ; 1 1 1 1 1 1 0 1 B |
| NONE | ; 1 1 1 1 1 1 1 0 B |
| NONE | ; 1 1 1 1 1 1 1 1 B |

| WHITE | BLACK | RUN LENGTH |
|---|---|---|
| 00110101 | 00000110111 | ; 0 |
| 000111 | 010 | ; 1 |
| 0111 | 11 | ; 2 |
| 1000 | 10 | ; 3 |

⋮

| 01001011 | 00000101100 | ; 60 |
| 00110010 | 000001011010 | ; 61 |
| 00110011 | 000001100110 | ; 62 |
| 00110100 | 000001100111 | ; 63 |

FIG. 3

| WHITE | BLACK | RUN LENGTH |
|---|---|---|
| 11011 | 0000001111 | ; 64 |
| 10010 | 000011001000 | ; 128 |
| 010111 | 000011001001 | ; 192 |
| 0110111 | 000001011011 | ; 256 |

⋮

| 000000011100 | 000000011100 | ; 2368 |
| 000000011101 | 000000011101 | ; 2432 |
| 000000011110 | 000000011110 | ; 2496 |
| 000000011111 | 000000011111 | ; 2560 |

FIG. 4

|  | ORIGINAL IMAGE PATTERN |
|---|---|
| NONE | ; 0 0 0 0 0 0 0 0 B |
| NONE | ; 0 0 0 0 0 0 0 1 B |
| 0 1 0<br>(BLACK "1") | ; 0 0 0 0 0 0 1 0 B |
| NONE | ; 0 0 0 0 0 0 1 1 B |
| 0 1 0<br>(BLACK "1") | ; 0 0 0 0 0 1 0 0 B |
| ⎰⎱ | ⎰⎱ |
| 0 1 0 0 0 0 1 1 1 0 1 0 0 0 0 1 1 1 0 1 0<br>(BLACK "1", WHITE "1", BLACK "1", WHITE "1", BLACK "1") | ; 0 1 0 1 0 1 0 0 B |
| ⎰⎱ | ⎰⎱ |
| 0 0 0 1 1 1<br>(WHITE "1") | ; 1 1 1 1 1 0 1 1 B |
| NONE | ; 1 1 1 1 1 1 0 0 B |
| 0 0 0 1 1 1<br>(WHITE "1") | ; 1 1 1 1 1 1 0 1 B |
| NONE | ; 1 1 1 1 1 1 1 0 B |
| NONE | ; 1 1 1 1 1 1 1 1 B |

FIG. 5

| RUN LENGTH | | ORIGINAL IMAGE PATTERN |
|---|---|---|
| MSB SIDE | LSB SIDE | |
| 8 | 8 | ; 0 0 0 0 0 0 0 0 B |
| 7 | 1 | ; 0 0 0 0 0 0 0 1 B |
| 6 | 1 | ; 0 0 0 0 0 0 1 0 B |
| 6 | 2 | ; 0 0 0 0 0 0 1 1 B |
| 5 | 2 | ; 0 0 0 0 0 1 0 0 B |
| ⋮ | ⋮ | ⋮ |
| 1 | 2 | ; 0 1 0 1 0 1 0 0 B |
| ⋮ | ⋮ | ⋮ |
| 4 | 4 | ; 1 1 1 1 0 0 0 0 B |
| ⋮ | ⋮ | ⋮ |
| 5 | 2 | ; 1 1 1 1 1 0 1 1 B |
| 6 | 2 | ; 1 1 1 1 1 1 0 0 B |
| 6 | 1 | ; 1 1 1 1 1 1 0 1 B |
| 7 | 1 | ; 1 1 1 1 1 1 1 0 B |
| 8 | 8 | ; 1 1 1 1 1 1 1 1 B |

FIG. 6

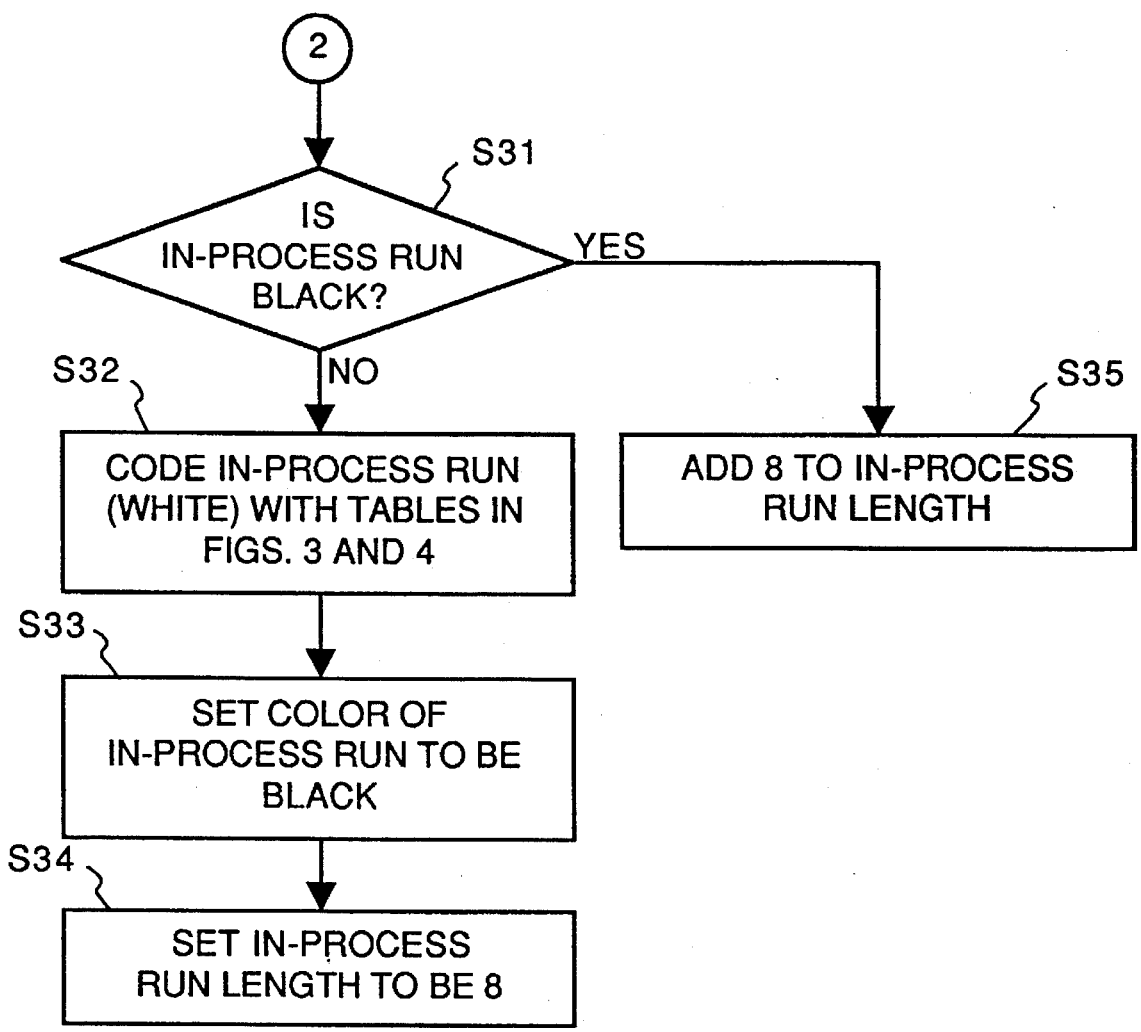
F I G. 10

IMAGE COMPRESSING APPARATUS

This application is a continuation of application Ser. No. 07/969,377 filed Oct. 30, 1992, now abandoned.

BACKGROUND OF THE INVENTION

The present invention relates to an image compressing apparatus for performing data compression by an MH (modified Huffman) compression method.

A conventional image compressing apparatus which is designed to perform data compression by the MH compression method has a table of MH codes corresponding to the run lengths of black and white pixels so as to alternately code pixels of the respective colors in accordance with the colors and run lengths of the pixels.

In the above-described conventional image compressing apparatus, however, coding is performed upon measuring the run length of pixels. Therefore, measurement and coding are repeatedly performed with respect to a portion where frequent changes between black and white occur, resulting in a delay in processing.

Following is a brief description of MH compression.

In MH compression, an original image to be coded is a black/white binary image, and coding is performed from an upper portion to a lower portion of an image (in the sub-scanning direction) in units of scanning lines. A continuation of white pixels is defined as a white run; a continuation of black pixels, a black run; and the length of a run, a run length. Coding is performed by using variable-length MH codes corresponding to the run lengths of the runs of an original image.

A run having a run length of 63 or less is coded with a terminating code. A run having a run length of 64 or more is coded with a makeup code and a terminating code indicating the difference between the run length and the makeup code (a terminating code is also added if the difference is "0"). Coding of one line is performed from the left to the right (in the main scanning direction) and is started from a white run (a terminating code of white "0" is initially added to a line having a black pixel at the start position).

A code (000000000001) called an EOL is added to coded data at the end of coding of one line, and a code (six consecutive EOLs) called an RTC indicating a page end is added to coded data at the end of coding of all the lines, thus completing image compression of one page.

SUMMARY OF THE INVENTION

The present invention seeks to provide an image compressing apparatus in which an original image with complicated patterns is coded in high speeds.

It is an object of the present invention to provide an image compressing apparatus which can perform image compression at high speed by increasing the coding speed at a portion, of an original image, where frequent changes between black and white occur.

In order to achieve the above object, according to the present invention, there is provided an image compressing apparatus for compressing an original image with MH codes, comprising means for obtaining run lengths of runs at two ends of each of binary patterns of black/white pixel strings each having a predetermined length, means for obtaining a frequency of change between black and white exhibited by a binary pattern of each of pixel strings constituting the original image, each of which has the predetermined length, on the basis of the respective run lengths, and means for performing MH coding of the binary pattern of each of the pixel strings constituting the original image, each of which has the predetermined length, in accordance with the frequency of change between black and white, wherein when the frequency of change between black and white exceeds a predetermined value, coding is performed by using an MH code obtained by extending the MH code.

Preferably, when the sum of the respective run lengths is a predetermined value or less, a run whose length is entirely included in the binary pattern of each of pixel strings constituting the original image, each of which has a predetermined length, is coded with the extended MH code.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view showing white and black terminating codes;

FIG. 4 is a view showing white and black makeup codes;

FIG. 5 is a view showing extended MH codes according to the embodiment;

FIG. 6 is a view showing the run lengths of runs on the two ends of one byte of pixels;

FIGS. 8 to 10 are flow charts showing byte processing in the facsimile apparatus according to the embodiment.

DETAILED DESCRIPTION OF THE PREFERRED EMBODIMENT

A preferred embodiment of the present invention will be described in detail below with reference to the accompanying drawings.

Figure 1:
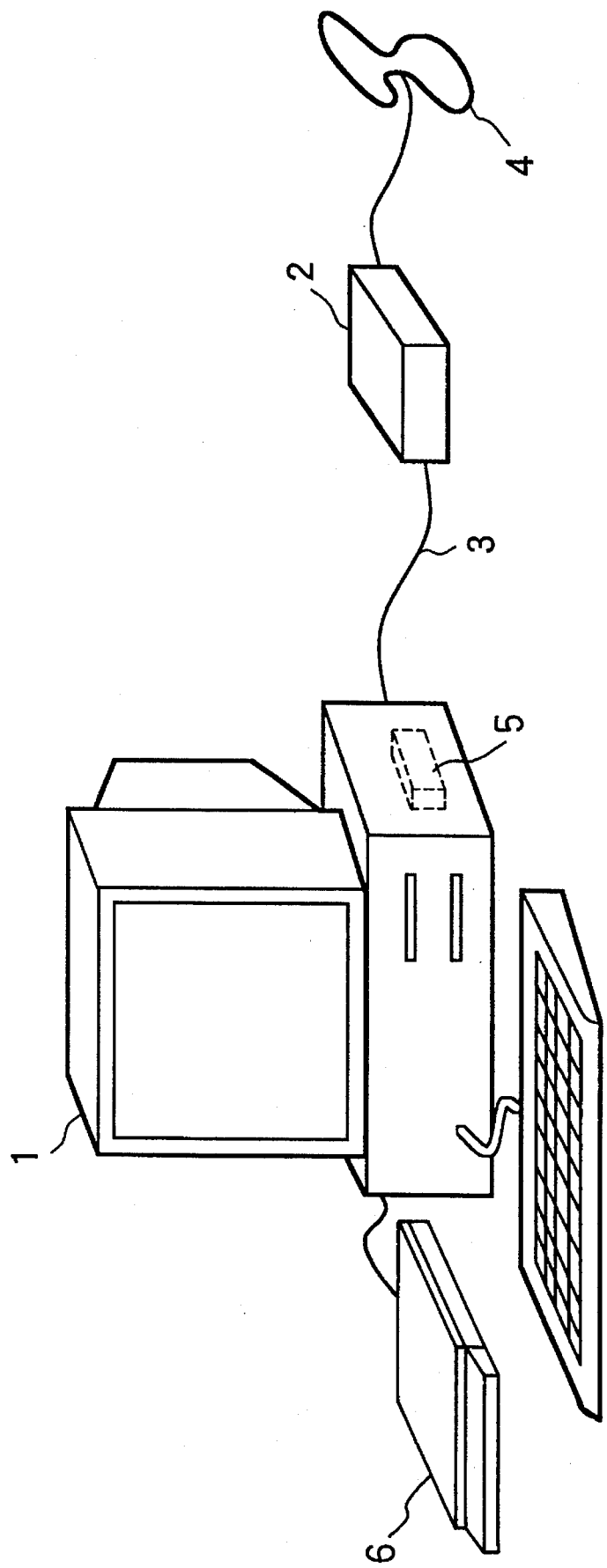
FIG. 1 is a perspective view showing the arrangement of a facsimile apparatus as an image compressing apparatus according to an embodiment of the present invention.

FIG. 1 shows the arrangement of a facsimile apparatus as an image compressing apparatus according to an embodiment of the present invention. In this embodiment, the facsimile apparatus is constituted by a personal computer and a modemphone. More specifically, as shown in FIG. 1, a personal computer 1 is connected to a modemphone 2 through an RS-232C cable 3. The modemphone 2 is connected to a public line 4. In this case, facsimile transmission is performed in such a manner that line connection with a transmission destination is completed according to a predetermined procedure, and image data converted into MH codes by the personal computer 1 is transmitted to the transmission destination. The facsimile transmission is completed when the line connected to the transmission destination is disconnected.

MH compression in this embodiment will be described in detail next.

Figure 2:
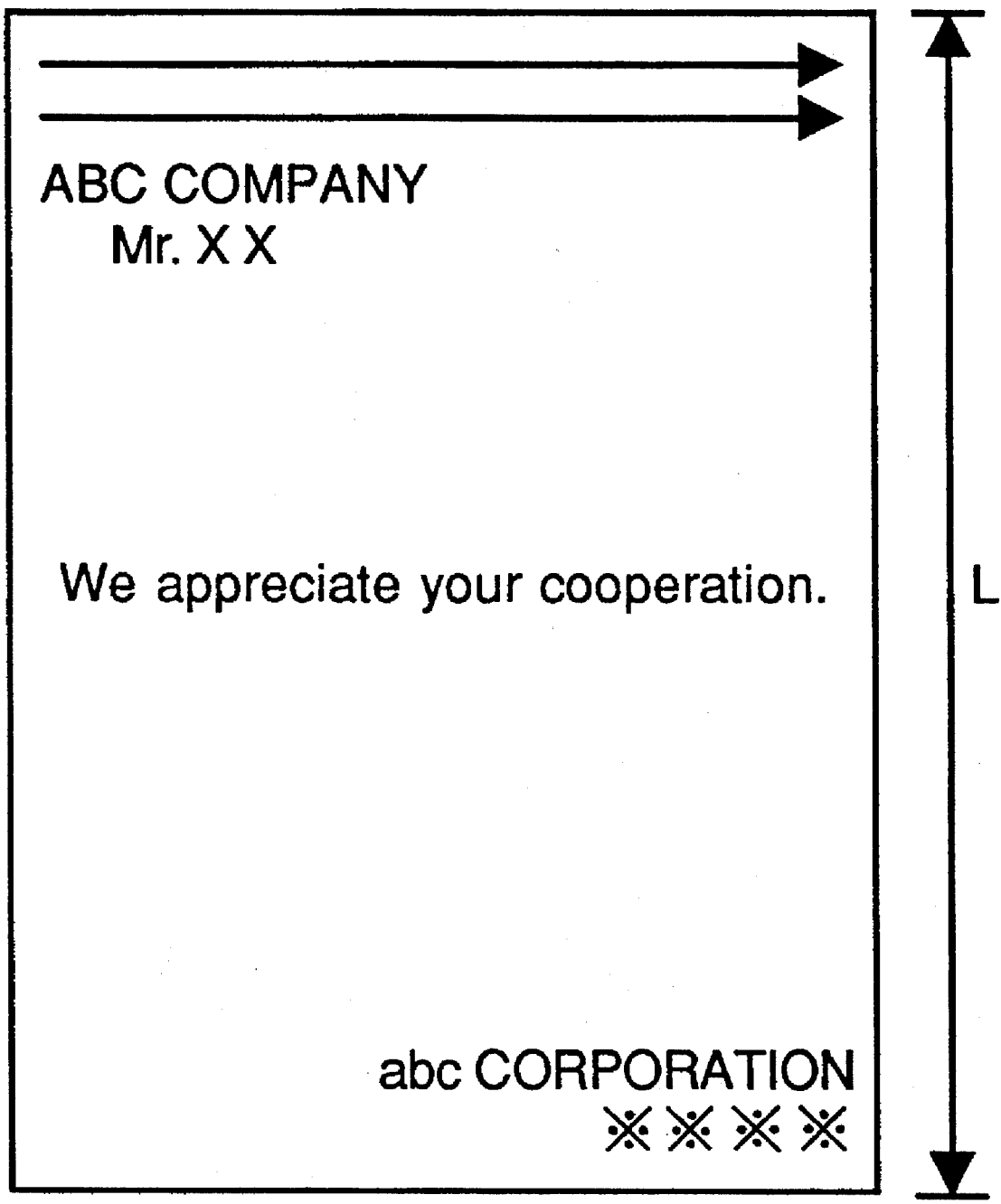
FIG. 2 is a view showing a facsimile transmission original processed by the facsimile apparatus according to the embodiment.

FIG. 2 shows a facsimile transmission original processed by the facsimile apparatus according to the embodiment. Binary data read from this original by a scanner 6 is stored in a memory 5 in the personal computer 1. Scanning by means of the scanner is performed from the left to the right, starting from the upper left end of the original, according to the rules of facsimile transmission, as shown in FIG. 2. When scanning of one line is completed, scanning is started again from the left to the right of the next line. That is, so-called raster scanning is repeated by the number of times corresponding to an original length L.

Assume that an MSB (Most Significant Bit) and an LSB (Least Significant Bit) are respectively located at the left and right sides of each byte constituting data obtained by the above-described scanning scheme.

FIG. 3 shows white and black terminating codes; and FIG. 4, white and black makeup codes. These codes are stored in the memory 5 of the personal computer 1.

FIG. 5 shows extended MH codes according to the embodiment. In this case, since the unit length of original image to be processed by referring to the tables shown in FIGS. 3 and 6 is one byte, MH codes corresponding to black and white runs whose run lengths are determined in one byte are combined with each other. These codes are stored in the memory 5 of the personal computer 1. FIG. 6 shows the run lengths of runs on the two ends of each byte of pixels. These data are also stored in the memory 5 of the personal computer 1.

Since MH compression is performed by repeating line processing, line processing will be described below.

Figure 7:
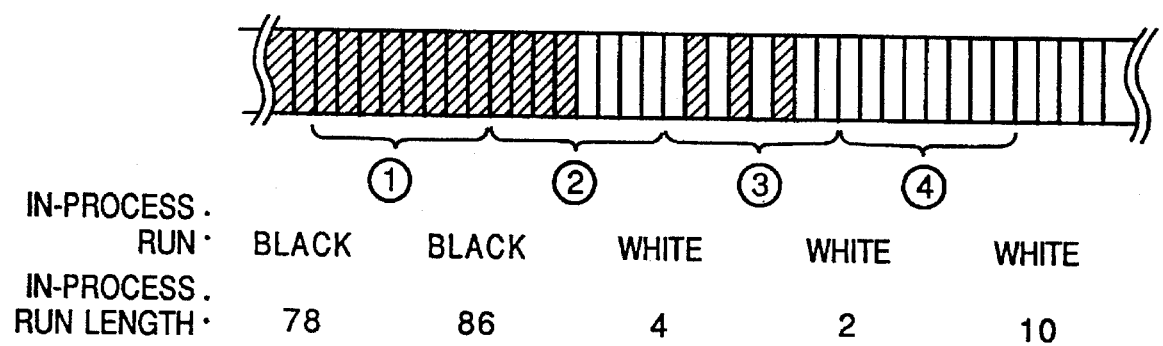
FIG. 7 is a view showing a portion of a line to be compressed.

In the embodiment, an original image is developed in the memory 5, as shown in FIG. 7. Measurement of run length and coding are repeatedly performed with respect to this original image in units of bytes. Note that a run which is being measured is called an "in-process run" in the following description.

FIG. 7 shows a portion of an image line to be compressed. Assume that an in-process run in processing immediately before the byte indicated by ① in FIG. 7 is a black run, and the in-process run length is 78.

Processing of the bytes respectively indicated by ①, ②, ③, ④ and in FIG. 7 will be described below with reference to the flow charts shown in FIGS. 8 to 10.

Figure 8:
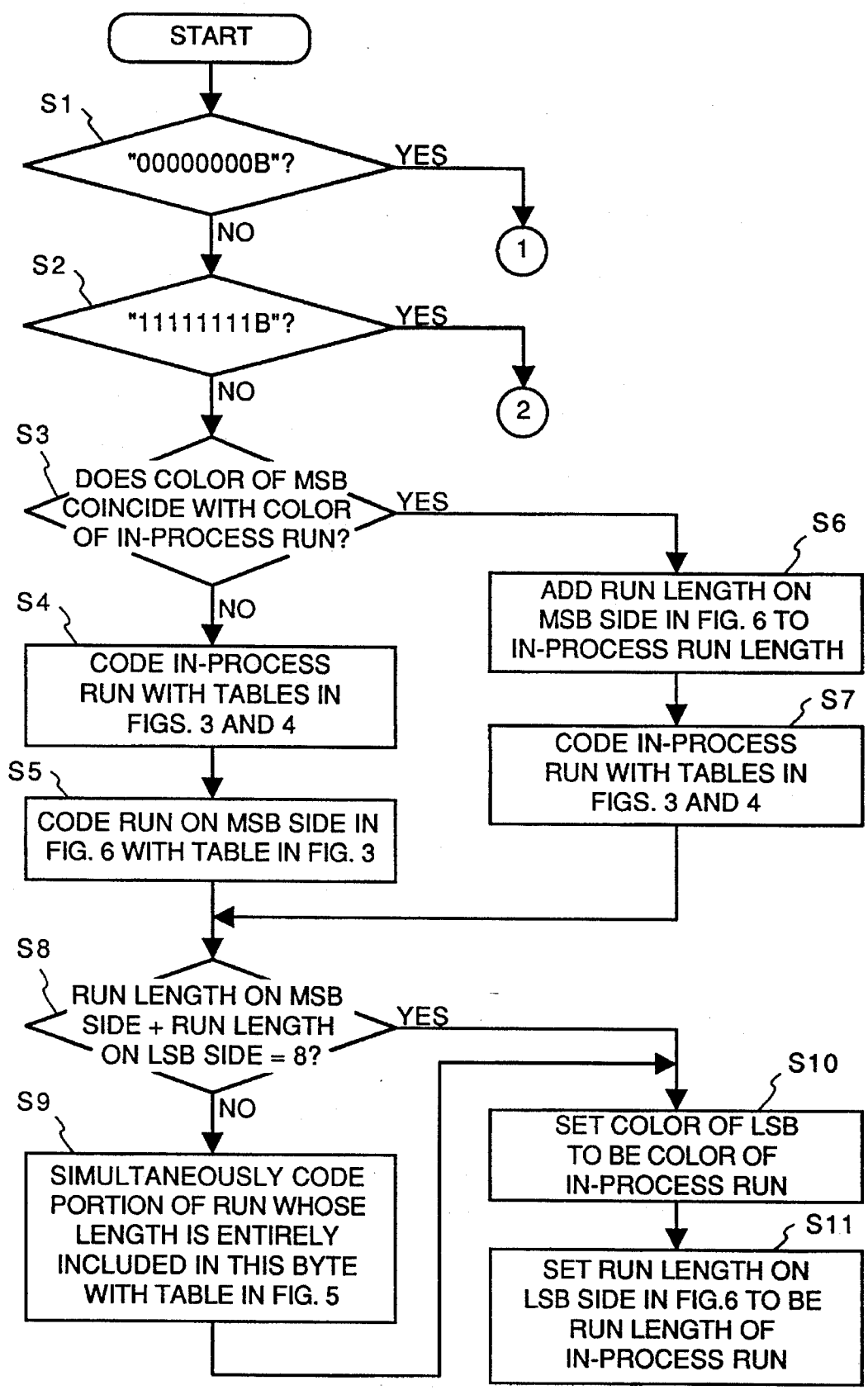

FIG. 8 is a flow chart showing byte processing in a case wherein a byte of an original image pattern to be processed has a pattern other than "00000000B" and "11111111B" (B indicates a binary number). Since one byte indicated by ① in FIG. 7 is "11111111B", YES is obtained in step S2 in the processing indicated by the flow chart in FIG. 8. As a result, the flow advances to the processing shown in FIG. 10. In this case, since the in-process run is a black run, as described above, YES is obtained in step S31 in the processing indicated by the flow chart in FIG. 10. As a result, in step S35, "8" is added to the in-process run length "78", and hence the in-process run length becomes "86".

If NO in step S31, i.e., if the color of a target original image pattern does not coincide with that of an in-process run, the in-process run ("white" in this case) is coded by referring to the tables shown in FIGS. 3 and 4 in step S32. After the color of the in-process run is set to be "black" in step S33, the run length of the in-process run is set to be "8" in step S34.

The original image pattern of one byte indicated by ② in FIG. 7 is "11110000B" and the color of the pixel of the MSB of the byte coincides with that of the in-process run ("black" in this case, as described above). Therefore, YES is obtained in step S3 in FIG. 8. In step S6, a run length of 4 on the MSB side of the pattern "11110000B" is added to the above-mentioned run length "86" by referring to the table shown in FIG. 6. In step S7, the in-process run having a run length of 90 obtained in step S6 is coded, as a black run, in accordance with the tables shown in FIGS. 3 and 4.

If the color of the pixel of the MSB does not coincide with that of the in-process run, the in-process run is coded in accordance with the tables in FIGS. 3 and 4 in step S4, and the run on the MSB side in FIG. 6 is coded in accordance with the table in FIG. 3 in step S5.

Referring to FIG. 6, of the run length indicated by ②, the run length on the LSB side is "4" and the run length on the MSB side is also "4". Since the two run lengths are added to obtain "8" (there is no run whose run length is entirely included in this byte), YES is obtained in step S8 in FIG. 8. In step S10, the color (white) of the pixel of the LSB is set to be the color of the in-process run. Subsequently, in step S11, by referring to the table shown in FIG. 6 with respect to "11110000B", the run length "4" on the LSB side indicated by ② in FIG. 6 is set to be the run length of the in-process run.

With regard to one byte indicated by ③ in FIG. 7, since its original image pattern is "01010100B", and the color of the pixel of the MSB coincides with the color of the in-process run, YES is obtained in step S3 in FIG. 8. Therefore, the table shown in FIG. 6 is referred with respect to the pattern "01010100B", the run length "1" on the MSB side of the byte indicated by ③ in FIG. 7 is added to the run length "4", and the corresponding byte is coded as an in-process run having a run length of 5 according to the table shown in FIG. 3.

As indicated by ③ in FIG. 6, the run lengths on the LSB and MSb sides of the byte "01010100B" are 2 and 1, respectively. Since the sum of the two run lengths is less than 8 (there is a run whose run length is entirely included in this one byte), NO is obtained in step S8 in FIG. S8. As a result, the flow advances to step S9 to simultaneously perform coding of "10101" of the pattern "01010100B" with the code "01000011101000011010" indicated by ③ in FIG. 5 by referring to the table shown in FIG. 5 with respect to "01010100B", i.e., the table of the extended MH codes. Subsequently, in step S10, the color (white) of the pixel of the LSB is set to be the color of the in-process run. In step S11, the run length "2" on the LSB side of the byte indicated by ③ in FIG. 6 is set to be the run length of the in-process run by referring to the table in FIG. 6 with respect to "01010100B".

Figure 9:
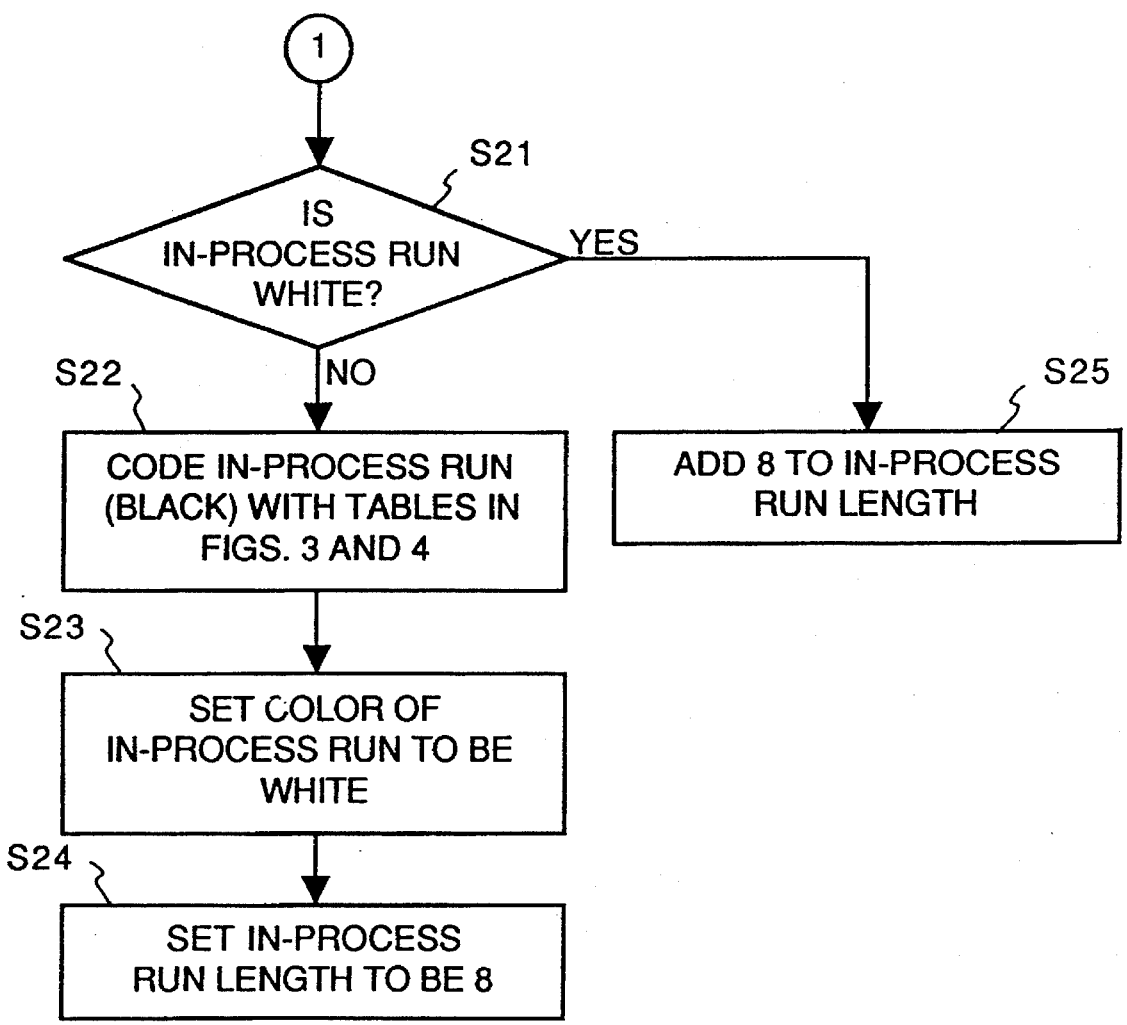

Since one byte indicated by ④ in FIG. 7 is "00000000B", YES is obtained in step S1 in FIG. 8, and the processing shown in FIG. 9 is executed. More specifically, YES is obtained in step S21 in FIG. 9 because the in-process run is "white", as described above. As a result in step S25, "8" is added to the in-process run length "2" to set the in-process run length to be "10". Since the processing in steps S22 to S24 is the same as that in steps S32 to S34, a description thereof will be omitted.

The above-described processing is repeated with respect to the respective bytes of one line, and an EOL is added to the end of the coded data obtained by coding a total of 1,728 pixels, thus completing coding of one line.

As described above, a table of extended MH codes is prepared with respect to combinations of consecutive white and black pixels. When a portion where frequent changes between black and white occur is to be coded, the coding speed and the speed of image compression can be increased by simultaneously coding consecutive black/white pixels without measuring the run lengths of pixels.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for executing run-length coding on binarized image data in black/white, comprising:

input means for inputting binarized image data in black/white;

recognition means for performing a pattern recognition on said inputted binarized image data, for every prescribed unit of bits starting with a first bit of a line of said image data;

detection means for detecting whether a number of color reversals in black/white is at least two or is less than two, within each unit of bits recognized by said recognition means;

lookup table means for storing in advance run-length codes, each stored run-length code corresponding to a respective black/white pixel pattern having a number of bits equal to or less than the prescribed unit, each said pixel pattern beginning with two pixels of opposite color and terminating with two pixels of opposite color;

counting means for counting a number of pixels of a same color in each recognized unit having at least one color reversal, wherein the counting starts with pixel data in which one of said color reversals occurs last in the respective recognized unit; and coding means for performing a run length coding on each recognized unit in accordance with both a count value of said counting means for the respective recognized unit and a color of the pixels counted by said counting means to provide the respective count value, wherein, when said detection means detects that the number of said color reversals is at least two in the respective recognized unit, the pixels between a first one of said color reversals and a last one of said color reversals in the recognized unit are identified as intermediate pixels and said coding means reads out, from said lookup table means, a run-length code corresponding to a pattern formed by the intermediate pixels of the respective recognized unit for coding the intermediate pixels, and, when said detection means detects that the number of said color reversals is less than two in the respective recognized unit, said coding means codes each run of same color pixels separately without accessing said lookup table means.

2. A apparatus according to claim 1, wherein said run length codes are modified Huffman codes.

3. The apparatus according to claim 1, wherein when a color of a last pixel of image data in a preceding prescribed unit of bits is different from a color of a first pixel of image data in a current prescribed unit of bits, said detection means detects the difference of color as being a color reversal.

* * * * *

UNITED STATES PATENT AND TRADEMARK OFFICE
CERTIFICATE OF CORRECTION

PATENT NO. : 5,537,616
DATED : July 16, 1996
INVENTOR(S) : HIROKAZU HIGUCHI

It is certified that error appears in the above-indentified patent and that said Letters Patent is hereby corrected as shown below:

COLUMN 3

Line 43, "④ and" should read --and ④--;
Line 48, "indicated by in" should read --indicated by ① in--.

COLUMN 4

Line 35, "MSb" should read --MSB--;
Line 38, "FIG. s8." should read --FIG. 8.--.

COLUMN 6

Line 23, "A" should read --An--.

Signed and Sealed this

Seventh Day of January, 1997

Attest:

BRUCE LEHMAN

Attesting Officer     Commissioner of Patents and Trademarks